(12) United States Patent
Seo et al.

(10) Patent No.: US 11,069,115 B2
(45) Date of Patent: Jul. 20, 2021

(54) METHOD OF CONTROLLING DISPLAY OF AVATAR AND ELECTRONIC DEVICE THEREFOR

(71) Applicant: Samsung Electronics Co., Ltd., Suwon-si (KR)

(72) Inventors: Donghwan Seo, Gyeonggi-do (KR); Hyejin Kang, Gyeonggi-do (KR); Junho An, Gyeonggi-do (KR); Minsheok Choi, Gyeonggi-do (KR); Yonggyoo Kim, Gyeonggi-do (KR); Junyoung Park, Gyeonggi-do (KR); Chanhee Yoon, Gyeonggi-do (KR); Wooyong Lee, Gyeonggi-do (KR); Jonghoon Won, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/795,794

(22) Filed: Feb. 20, 2020

(65) Prior Publication Data
US 2020/0265627 A1 Aug. 20, 2020

(30) Foreign Application Priority Data
Feb. 20, 2019 (KR) .......................... 10-2019-0019718

(51) Int. Cl.
*G06T 13/40* (2011.01)
*G06K 9/00* (2006.01)
(Continued)

(52) U.S. Cl.
CPC .......... *G06T 13/40* (2013.01); *G06K 9/00268* (2013.01); *G06K 9/00302* (2013.01);
(Continued)

(58) Field of Classification Search
None
See application file for complete search history.

(56) References Cited

U.S. PATENT DOCUMENTS

| 10,062,198 B2 | 8/2018 | Bhat et al. |
| 2014/0036027 A1* | 2/2014 | Liu .................. G06F 3/167 |
| | | 348/14.07 |

(Continued)

FOREIGN PATENT DOCUMENTS

| JP | 2006-331065 A | 12/2006 |
| KR | 2003-0029638 A | 4/2003 |
| WO | 02/09040 A1 | 1/2002 |

OTHER PUBLICATIONS

International Search Report dated Jun. 18, 2020.

*Primary Examiner* — Justin P. Misleh
(74) *Attorney, Agent, or Firm* — Cha & Reiter, LLC

(57) ABSTRACT

An electronic device and method are disclosed. The electronic device includes a camera, a display, and a processor. The processor implements the method, including capturing an image using a camera of the electronic device for animation of an avatar, the image including at least a part of a face of a user, analyzing, by a processor, a portion of the image including the at least the part of the face to determine whether an entirety of the face is captured within the image, and selecting a primary image or an alternative image for display of the avatar based on the determination, including: displaying the avatar on a display of the electronic device using the alternative image when less than the entirety of the face is captured within the image.

16 Claims, 10 Drawing Sheets

(51) Int. Cl.
*H04N 5/232* (2006.01)
*G06T 7/73* (2017.01)

(52) U.S. Cl.
CPC ........... *G06T 7/73* (2017.01); *H04N 5/23229* (2013.01); *G06T 2207/30201* (2013.01)

(56) References Cited

U.S. PATENT DOCUMENTS

| | | |
|---|---|---|
| 2015/0213604 A1 | 7/2015 | Li et al. |
| 2018/0005448 A1 | 1/2018 | Choukroun et al. |
| 2018/0107866 A1 | 4/2018 | Li et al. |
| 2018/0158240 A1 | 6/2018 | Saito et al. |

* cited by examiner

METHOD OF CONTROLLING DISPLAY OF AVATAR AND ELECTRONIC DEVICE THEREFOR

CROSS-REFERENCE TO RELATED APPLICATION(S)

This application is based on and claims priority under 35 U.S.C. 119 to Korean Patent Application No. 10-2019-0019718, filed on Feb. 20, 2019, in the Korean Intellectual Property Office, the disclosure of which is herein incorporated by reference in its entirety.

BACKGROUND

1) Field

The disclosure relates to an electronic device, and more particularly to a method of controlling the display of an avatar and an electronic device therefor.

2) Description of Related Art

Users commonly use digital avatars to express emotions to other users within online social interactions in a variety of virtual spaces. To improve this expression, technology has developed that applies an actual facial expression of a user to an animated avatar, enabling the avatars to express more varied and realistic emotional states. Particularly, when a user expresses a certain emotion through their facial expression, this can be detected using a camera a smart phone or the like, and the detected facial expression may be expressed through a digital avatar displayed on a screen. Thus, the avatar effectively mimics any changes in the facial expression of the user.

The above information is presented as background information only to assist with an understanding of the disclosure. No determination has been made, and no assertion is made, as to whether any of the above might be applicable as prior art with regard to the disclosure.

SUMMARY

An electronic device may apply changes in the facial expression and/or motions to an avatar. The facial expressions and motions may be freely made by a user, and the avatar may be animated to mimic the same, which is then displayed to a display. An issue may arise in which a user's face may be partially obstructed during this process. In order to maintain continuous display and animation of an avatar without discontinuity during an obstruction, the processor may utilize feature points, or regions/features of interest identified for the user's face, which generally control avatar animation. The feature points can be scored for reliability, indicating an estimate of how accurate they are in identifying and/or tracking a particular facial region or feature. Thus, when a portion of the user's face is obstructed and/or thus only partially recognized, these scores for the feature points may be required for continuing smooth generation and animation of an avatar.

An aspect of the disclosure is to provide a method of performing control so that an electronic device displays an avatar without discontinuity, and an apparatus therefor.

In accordance with an aspect of the disclosure, an operation method of an electronic device may include: capturing an image using a camera of the electronic device for animation of an avatar, the image including at least a part of a face of a user, analyzing, by a processor, a portion of the image including the at least the part of the face to determine whether an entirety of the face is captured within the image, and selecting a primary image or an alternative image for display of the avatar based on the determination, including: displaying the avatar on a display of the electronic device using the alternative image when less than the entirety of the face is captured within the image.

In accordance with an aspect of the disclosure, an electronic device may include a camera, a display, and a processor. The instructions are executable by the processor to cause the electronic device to: capture an image using a camera of the electronic device for animation of an avatar, the image including at least a part of a face of a user, analyze, by a processor, a portion of the image including the at least the part of the face to determine whether an entirety of the face is captured within the image, and select a primary image or an alternative image for display of the avatar based on the determination, including displaying the avatar on a display of the electronic device using the alternative image when less than the entirety of the face is captured within the image According to certain embodiments, there are provided a method and an electronic device, which determine whether to use an alternative image based on information related to an image of a user, which may be used for generating an avatar, or information associated with feature points obtained from an image of the user, when an avatar corresponding to the user is displayed on a screen, and may reliably provide the avatar without discontinuity.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments will be described in detail with reference to attached drawings.

Figure 1:
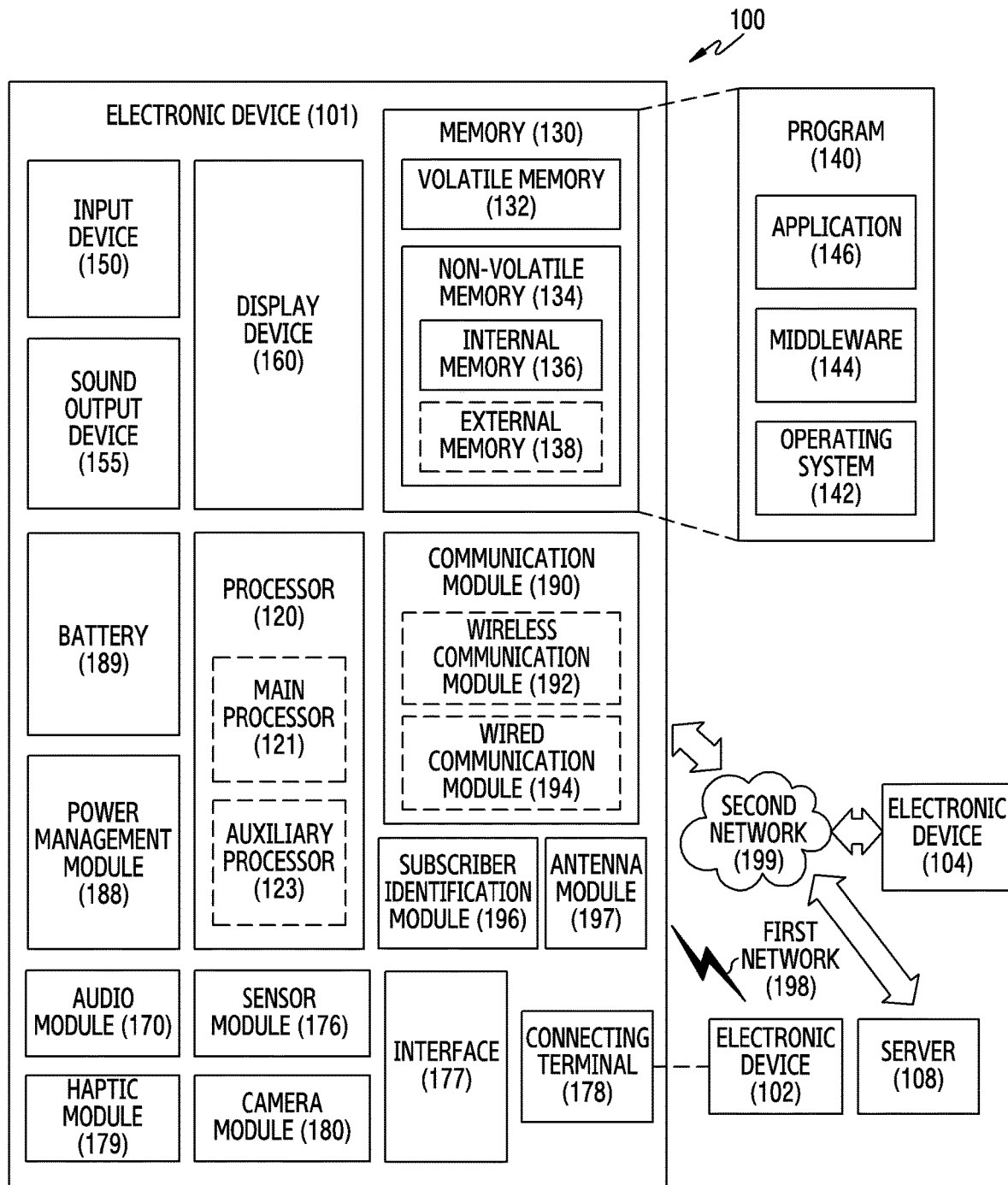
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
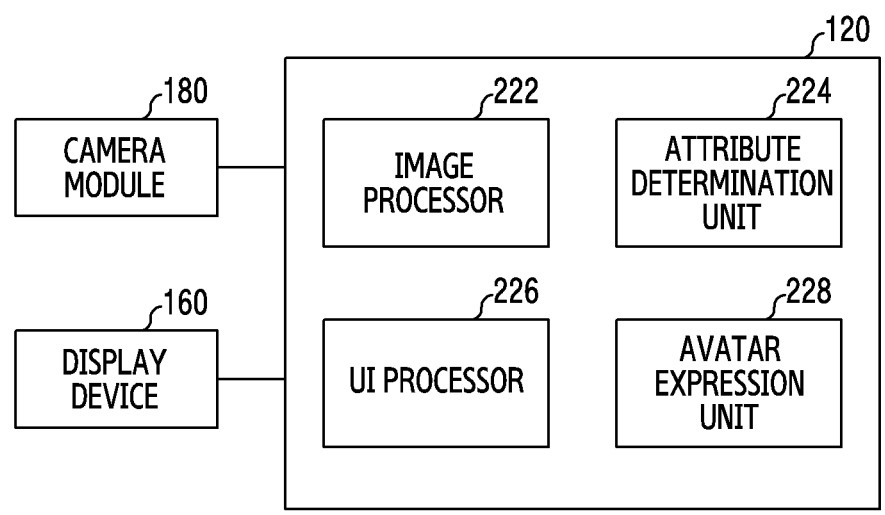
FIG. 2 is a diagram illustrating a configuration of an electronic device for controlling the display of an avatar according to certain embodiments.

FIG. 2 is a diagram illustrating the configuration of an electronic device for controlling the display of an avatar according to certain embodiments. The configuration of FIG. 2 may be understood as the configuration of a part of the electronic device 101. Referring to FIG. 2, the electronic device 101 may include the processor 120, the display device 160, and/or the camera module 180. According to certain embodiments, the processor 120 may include an image processor 222, an attribute determination unit 224, a user interface (UI) processor 226, and/or an avatar expression unit 228.

The image processor 222 may detect an area corresponding to the face of a user from an image that includes the face of the user and is obtained by the camera module 180. An image obtained by the camera module 180 or information associated with a user facial area detected by the image processor 222 may be used by the attribute determination unit 224. According to certain embodiments, the image processor 222 may include image processor hardware related to the camera module 180, such as an image signal processor (ISP), a central processing unit (CPU), a graphics processing unit (GPU), a digital processing unit (DSP), or the like.

The attribute determination unit 224 may determine an attribute related to the face of a user, as depicted in an image captured by the camera module 180. Attributes may be determined based on user facial area information obtained by the image processor 222. For example, the attribute determination unit 224 may determine and analyze feature points, extracted from the features of a face, in a frame received via capture by the camera module 180, and may obtain segmentation data, which is information associated with each facial part. Also, the attribute determination unit 224 may continuously track the determined feature points, and may obtain location information of the feature points for application to a 3-dimensional (3D) avatar. Also, the attribute determination unit 224 may apply weight values to the feature points, and may detect movement of the feature points (e.g., as the user moves their head, or changes their facial expression). According to certain embodiments, the attribute determination unit 224 may generate weight values based on scores indicating the reliability of each feature point. According to certain embodiments, the score of each feature point may be determined based on the characteristic of each feature point detected in the user facial area, as compared to a corresponding feature point in a previously defined template. For example, the score of each feature point may be determined based on the distance between each feature point of the user facial area and a corresponding feature point included in the template, or based on the reliability of the location of each feature point of the user facial area.

The UI processor 226 may provide an image input by the camera module 180 and an image processed by the image processor 222 to a user via a UI. For example, as display of a UI for an avatar, the UI processor 226 may display, to the user, one that is to be used for generating an avatar among the face of the user or the entire body of the user via the display 160. Also, as display of a UI associated with a photographed image, the UI processor 226 may display the face of the user which is being photographed by the camera module 180 on the display 160 as a preview. According to an embodiment, the UI processor 226 may be implemented so that display of a UI for an avatar and display of a UI for a photographed image are processed by different modules. According to another embodiment, the UI processor 226 may be implemented so that display of a UI for an avatar and display of a UI for a photographed image are processed by a single module.

The avatar expression unit 228 may generate and animate an avatar based on information provided from the attribute determination unit 224, and may display the same via the display device 160. For example, the avatar expression unit 228 may determine the lineaments and facial expressions of a user based on the movement information detected via the feature points and segmentation data of each facial part, which are determined by the attribute determination unit 224. The avatar expression unit 228 may generate (and/or animate) the facial expression of an avatar to correspond to the actual facial expression of a user based on the determined lineaments, facial expression, and facial parts of the user. According to certain embodiments, the avatar expression unit 228 may determine whether to display an avatar using an alternative image based on information associated with feature points determined in consideration of the score of each feature point.

According to an embodiment, the attribute determination unit 224 may operate the above-described operations as a functional configuration. According to another embodiment, the attribute determination unit 224 may operate by being separated as a face alignment library and a mapper from a functional aspect. The face alignment library may determine feature points from an image photographed by the camera module 180, and may obtain location information of the feature points. The mapper may determine movement information of feature points based on location information of feature points to which weight values are applied.

According to certain embodiments, the display device 160, the UI processor 226, and the avatar expression unit 228 may operate as a rendering unit from a functional aspect. The rendering unit may determine the facial expression of an avatar based on movement information of feature points determined by the mapper, and may display the same on the display device 160.

According to certain embodiments, an electronic device (e.g., the electronic device 101) may include a camera (e.g., the camera module 180), a display (e.g., the display device 160), and a processor (e.g., the processor 120), and the processor may be configured to: obtain an image of a user of the electronic device for an avatar of the user, using the camera; determine whether information associated with at least a part of a face of the user, which is detected from the obtained image, is obtained incompletely; and if the information associated with at least the part of the face of the user is determined to have been obtained incompletely, displaying the avatar on the display of the electronic device using an alternative image.

According to certain embodiments, the processor (e.g., the processor 120) may be further configured to: determine whether at least a part of the face of the user detected from the obtained image is covered with an obstacle, in order to determine whether information associated with at least a part of the face of the user detected from the obtained image is obtained incompletely; and in order to display the avatar on the display (e.g., the display device 160) of the electronic device (e.g., the electronic device 101) using the alternative image if the information associated with at least the part of the face of the user is determined to have been obtained incompletely, display the avatar on the display of the electronic device using the alternative image if at least a part of the face of the user is determined to be covered with the obstacle.

According to certain embodiments, the processor (e.g., the processor 120) may be further configured to: in order to determine whether at least a part of the face of the user detected from the obtained image is covered with the obstacle, determine whether the obstacle exists based on whether the face of the user and another object corresponding to the obstacle overlap in the obtained image.

According to certain embodiments, whether the face of the user and the other object corresponding to the obstacle overlap may be identified based on scores indicating reliability of feature points detected in association with the face of the user.

According to certain embodiments, the processor (e.g., the processor 120) may be further configured to: in order to display the avatar on the display (e.g., the display device 160) using the alternative image, display the avatar by replacing at least a part of the avatar using an image of the avatar having a predetermined shape.

According to certain embodiments, the processor (e.g., the processor 120) may be further configured to: in order to display the avatar on the display (e.g., the display device 160) using the alternative image, display the avatar by replacing at least a part of the avatar using an image of the avatar in a shape generated from an image obtained in a previous frame.

According to certain embodiments, the processor (e.g., the processor 120) is further configured to: in order to display the avatar on the display (e.g., the display device 160) using the alternative image, substitute movement information of at least one other feature point for movement information of at least one feature point detected from the face of the user, and control display of the avatar based on the substituted movement information.

According to certain embodiments, in order to determine whether information associated with at least a part of the face of the user detected from the obtained image is obtained incompletely, the processor (e.g., the processor 120) may be further configured to: measure a size of the face of the user in the obtained image; identify whether the size of the face of the user has a value smaller than a threshold value; and in order to display the avatar on the display (e.g., the display device 160) of the electronic device using the alternative image, if information associated with at least a part of the face of the user is determined to have been obtained incompletely, display the avatar on the display of the electronic device (e.g., the electronic device 101) using the alternative image, if the size of the face of the user is identified as having a value smaller than the threshold value.

According to certain embodiments, the processor (e.g., the processor 120) may be further configured to: in order to display the avatar on the display (e.g., the display device 160) of the electronic device (e.g., the electronic device 101) using the alternative image, if information associated with at least a part of the face of the user is determined to have been obtained incompletely, display the avatar on the display of the electronic device using the alternative image if the face of the user is located in a peripheral area of the obtained image, such that the peripheral area of the image is an area where the image is distorted due to a lens of the camera within the obtained image.

According to certain embodiments, the processor (e.g., the processor 120) may be further configured to: in order to display the avatar on the display (e.g., the display device 160) of the electronic device (e.g., the electronic device 101) using the alternative image if information associated with at least a part of the face of the user is determined to have been obtained incompletely, display the avatar on the display of the electronic device using the alternative image if the face of the user is not detected from the obtained image.

Figure 3:
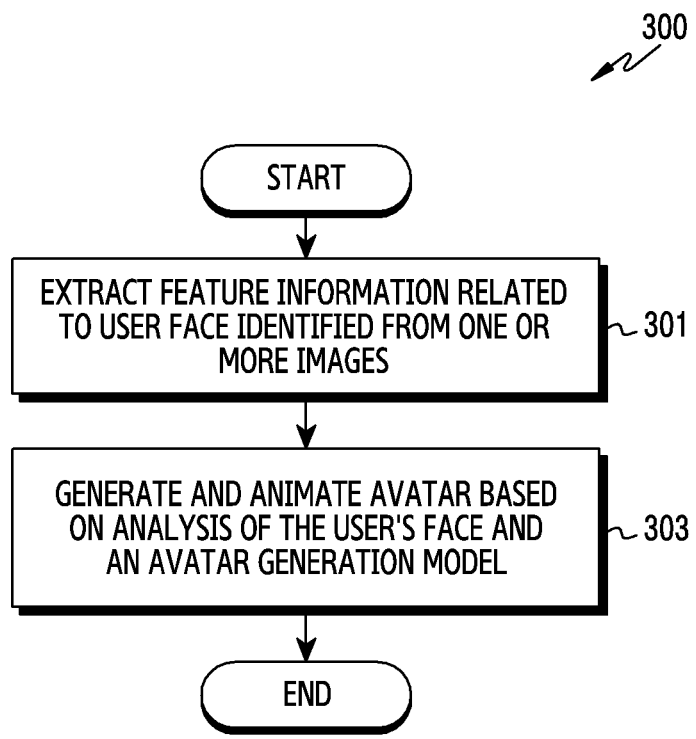
FIG. 3 is a flowchart illustrating a process of generating an avatar by an electronic device according to certain embodiments.
Figure 4:
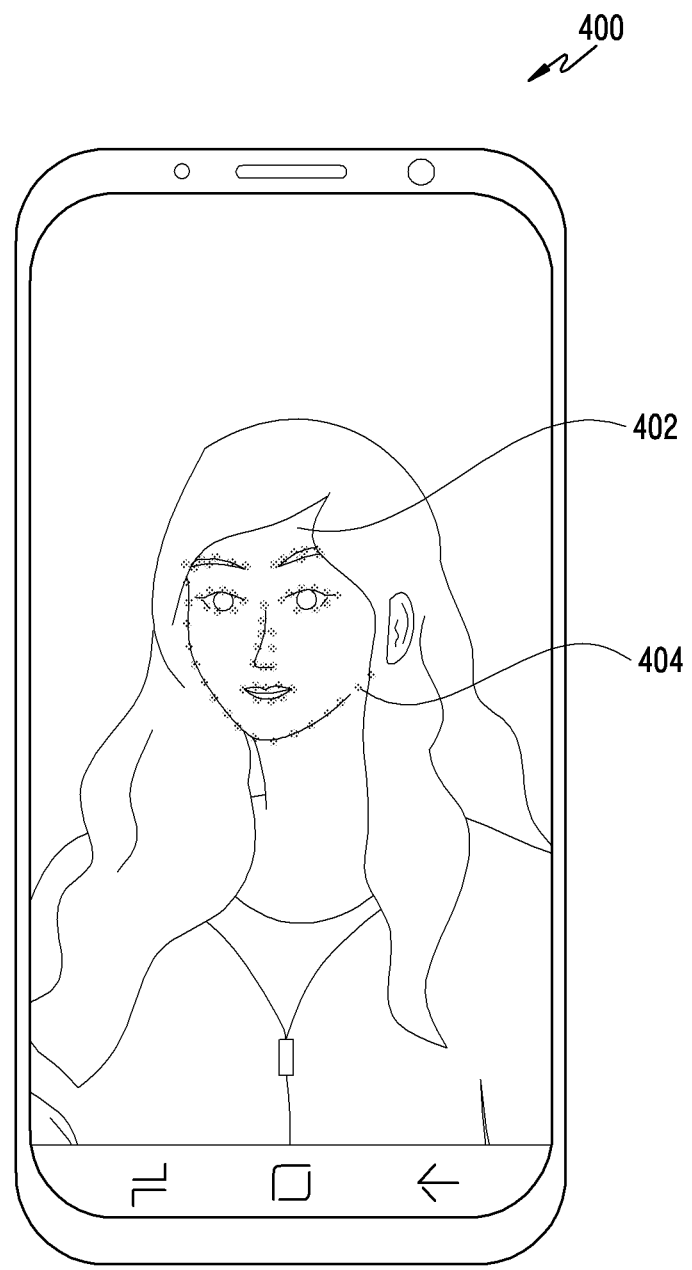
FIG. 4 is a diagram illustrating an example of feature points generated in order to display an avatar by an electronic device according to certain embodiments.

FIG. 3 is a flowchart 300 illustrating a process of generating an avatar by an electronic device according to certain embodiments. FIG. 4 is a diagram illustrating an example of feature points generated in order to display an avatar by an electronic device according to certain embodiments. The entity that operates according to the flowchart 300 of FIG. 3 may be understood to be the electronic device 101 or a component (e.g., the processor 120 or the camera module 180) of the electronic device 101.

Referring to FIG. 3, in operation 301, the electronic device 101 (e.g., the processor 120 or the camera module 180) may extract feature information related to the face of a user that is identified as present in one or more images. According to certain embodiments, a user may be the user of the electronic device 101. The electronic device 101 may detect the facial area of a user from one or more images obtained by a camera module (e.g., the camera module 180), and may detect feature information related to the face of the user and/or feature points associated with the face of the user. For example, as illustrated in FIG. 4, the electronic device 101 may detect a facial area 402 of the user, and may detect feature points 404 related to the face of the user. The feature points 404 may be detected from facial features (e.g., the contour/silhouette of a face, eyebrows, eyes, nose, mouth, jawline, or the like) as detected within a shape of the facial area 402 of the user, which is recognized from analysis of the image 400. According to certain embodiments, if an obstacle (e.g., a hand, a foot, or an object of the user) is located on a part of the face of the user, some of the feature points 404 may fail to be detected or be detected without sufficient certainly, as the electronic device 101 attempts to detect feature points of the face in a region where the obstacle obstructs a view of the face.

In operation 303, the electronic device 101 may generate (and/or animate) an avatar to which the features of the face of the user are applied, based on the feature information and an avatar generation model. According to certain embodiments, the avatar generation model may indicate basic information for generating and/or animating an avatar. For example, the avatar generation model may include at least one of a method of defining the shape of an avatar, a method of defining a line that connects points for expressing the shape of an avatar, and/or a method of defining the direction of the points. According to certain embodiments, the avatar generation model may be referred to as a morph target, and may be stored in advance in a memory (e.g., the memory 130) (i.e., the avatar generation model may be defined in advance) or may be generated by the processor 120 based on feature information. The processor 120 may generate an avatar to which the features of the face of the user (e.g., including at least one of the disposition of the eyes, nose, and mouth, a size, a shape, a color, a skin color, or a skin texture) are applied, based on feature information and an avatar generation model.

Figure 5:
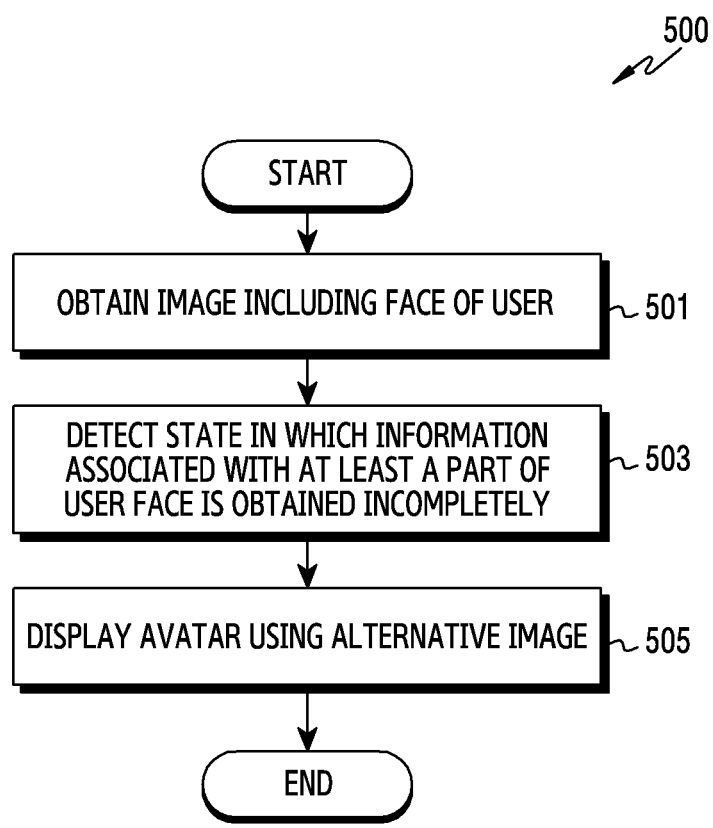
FIG. 5 is a flowchart illustrating a process of controlling the display of an avatar using an alternative image by an electronic device according to certain embodiments.

FIG. 5 is a flowchart 500 illustrating a process of controlling the display of an avatar using an alternative image by an electronic device according to certain embodiments. The entity that operates according to the flowchart 500 of FIG. 5 may be understood to be the electronic device 101 or a component (e.g., the processor 120 or the camera module 180) of the electronic device 101.

Referring to FIG. 5, in operation 501, the electronic device 101 (e.g., the processor 120 or the camera module 180) may obtain an image including the face of a user. The electronic device 101 may receive an image including the face of the user as frames by a camera module (e.g., camera module 180). According to certain embodiments, the electronic device 101 may use a frame in which an image and depth data are combined. For example, the electronic device 101 may receive an image associated with a neutral facial expression of the user for initial generation of an avatar. Also, after generating an avatar, the electronic device 101 may receive an image associated with a facial expression of the user. According to an embodiment, the electronic device 101 may obtain an image in which the face of the user is included but in which a part of the face is covered with an obstacle and is not photographed. The obstacle may be anything that covers a part of the face of the user, such as a hand, foot, or any item other than the face of the user. According to another embodiment, the electronic device 101 may obtain an image in which a part of the face of the user is not included. For example, the face of the user may be located at an edge as opposed to the center of a frame, so that a part of the face may not be photographed by the camera module 180. According to another embodiment, the electronic device 101 may obtain an image in which the facial area of the user is located in a part where distortion may occur due to the characteristics of a lens. The distortion may occur highly in a part that is close to an edge of a frame or in a part that is far from the center of the frame. According to another embodiment, the electronic device 101 may obtain an image in which the entire face of the user is included but the photographed size of the face is small compared to the size of the entire image.

In operation 503, the electronic device 101 may detect a state in which information associated with at least a part of the face of the user is incompletely obtained. The incomplete information may be understood as quantitative loss or qualitative uncertainty. For example, if at least a part of the face is obstructed from view of the camera by an obstacle, if a part of the face is not photographically captured, if the face is located in a peripheral area of an image where image distortion is present, and/or if the face is not captured in sufficient detail due to excessive distance from the camera, the device 101 may determine capture to be the state in which information associated with at least a part of the face has been incompletely obtained. According to an embodiment, the state in which a part of the face of the user is covered with an obstacle may be determined based on a reliability score of a feature point, or on the recognition of an object (e.g., a hand) which is different from the face of the user. According to an embodiment, the state of being partially photographed may be detected based on a failure to identify a complete facial area of the user, and/or a failure to detect all expected feature points for the user's facial features. According to another embodiment, the state of an excessive distance from the camera may be detected based on a size of the face in an image being smaller than a threshold size, or based on the score of one or more feature points being lower than a threshold score. According to another embodiment, the state of being located in a peripheral area of the image may be determined based detecting of the location of the face in an image, or based on the score of one or more feature point.

In operation 505, the electronic device 101 may display an avatar using an alternative image when one of the indicated states is detected. The cases identified in operation 503 may cause discontinuity of an avatar being displayed by the display device (e.g., the display device 160). For example, if the electronic device 101 fails to detect the facial area of the user (e.g., the state of being partially photographed), feature points may not be generated and thus an avatar associated with the user may not be generated. If at least one feature point having a score less than or equal to a threshold value exists (e.g., a state of being covered with an obstacle, a state of being a long distance away, or a state of being located in a peripheral area), it is determined that a facial part of an avatar which corresponds to at least one corresponding feature point shows shivering or that an avatar gives an unclear facial expression. The electronic device 101 may perform control so as to display an avatar without discontinuity by displaying the avatar using an alternative image. According to certain embodiments, an alternative image may be variously implemented using an image showing a predetermined facial expression of an avatar (e.g., a neutral facial expression, happiness, sadness, or the like), an image showing a predetermined shape of an avatar, an image showing the shape of a previously displayed avatar, or an image based on the facial parts of an avatar generated by feature points having scores greater than a threshold value, and the like.

Figure 6:
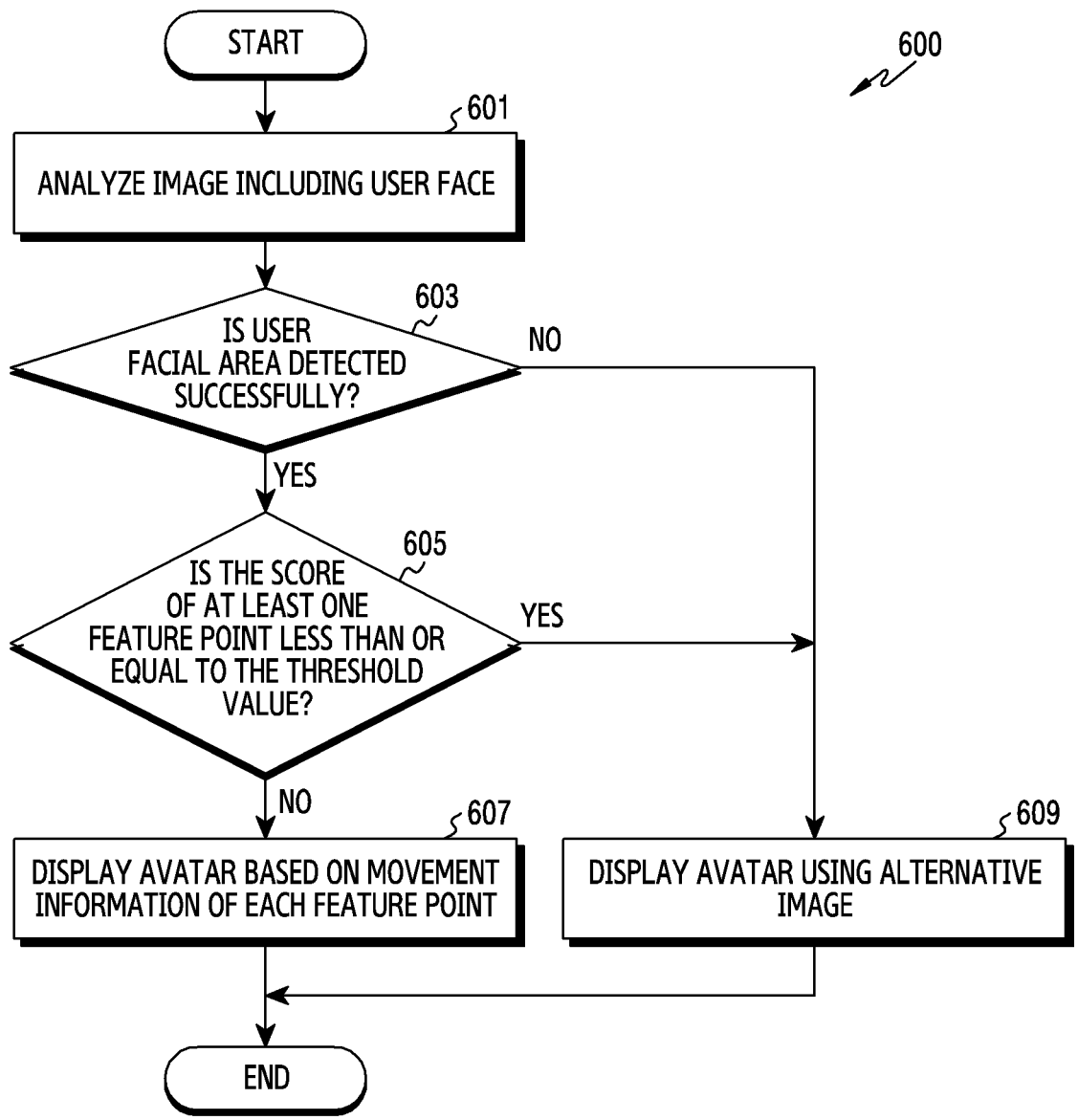
FIG. 6 is a flowchart illustrating a process of determining whether to display an avatar using an alternative image by an electronic device according to certain embodiments.

FIG. 6 is a flowchart 600 illustrating a process of determining whether to display an avatar using an alternative image by an electronic device according to certain embodiments. In FIG. 6, operations 601 to 609 may be related to operations 503 to 505 of FIG. 5. The entity that operates according to the flowchart 600 of FIG. 6 may be understood as the electronic device 101 or a component (e.g., the processor 120 or the camera module 180) of the electronic device 101.

Referring to FIG. 6, in operation 601, the electronic device 101 (e.g., the processor 120 or the camera module 180) may analyze an image including the face of a user. For example, the electronic device 101 may obtain an image for controlling the facial expression of an avatar to correspond to a change in the facial expression of the user after generating the avatar. The electronic device 101 may obtain an image including the face of the user using a camera module (e.g., the camera module 180), and may attempt to detect the facial area of the user from the image.

In operation 603, the electronic device 101 may determine whether the facial area of the user is successfully detected. The electronic device 101 may determine whether the contour of the face of the user is detected from the image, based on the symmetry of the face, face color information, or face brightness information.

If it is determined that the facial area of the user is successfully detected, the electronic device 101 may determine whether at least one feature point having a score less than or equal to a threshold value is detected for the face in operation 605. For example, if the contour of the face of the user, from which the shape of a face is identified, is detected from an obtained image, the electronic device 101 may determine that the facial area is successfully detected. Generally, when photographing is performed by the camera module 180, the entirety of a face is included in an image, even if the subject is too far away from the camera or located in a peripheral region of the image). Similarly, when a part of the face of the user is blocked from the camera by an obstruction, the electronic device 101 may still successfully detect the facial area of the user based on the partially visible region. To successfully address these deficient states, the electronic device 101 may detect feature points from the facial area, and may determine a score for each feature point. Then, the electronic device 101 may compare each of the determined scores with a threshold value, and may determine whether at least one feature point has a score sufficient low as to indicate a level of uncertainty that the facial feature can be successfully applied to the avatar (e.g., by comparison against a threshold score).

If it is determined that all feature points have a score greater than the threshold value, the electronic device 101 may generate (and/or animate) and display the avatar based on movement information detected from the feature points in operation 607. If at least one feature point having a score less than or equal to the threshold value does not exist, information associated with each feature point may be reliably provided. The electronic device 101 may perform control to change the facial expression of the avatar using movement information of each feature point which indicates a change in the location information of each feature point.

If it is determined that at least one feature point has a score less than or equal to the threshold value exists, the electronic device 101 may determine sufficient uncertainty exists as to preclude successful generation and/or animation of the avatar, and thus display the avatar using an alternative image in operation 609. According to the distribution of feature points having scores not greater than the threshold value, the electronic device 101 may determine whether to use the entirety of an alternative image or to use a part of the alternative image, for displaying an avatar. According to an embodiment, if a part of the face of the user is blocked from a view of the camera by an obstruction, and thus fails to be photographically captured, at least one feature point may then have a score less than or equal to the threshold value, especially in the portion of the face covered with the obstacle. In some embodiments, in this situation, the electronic device 101 may replace the entirety of the avatar with an image showing a predetermined facial expression (e.g., neutral facial expression, happiness, sadness, or the like), a predetermined avatar shape image, or a previously displayed avatar shape image. The electronic device 101 identifies a facial expression associated with another part so as to correct or replace feature points having scores less than or equal to the threshold value. For example, the electronic device 101 may correct or replace feature points having scores less than or equal to the threshold value using location information of feature points located in symmetric parts according to the symmetry of a face. According to another embodiment, the electronic device 101 may determine a facial expression based on the location information of feature points in another part, and may correct or replace feature points having scores less than or equal to the threshold value so as to correspond to the determined facial expression. According to another embodiment, if the size of the face of the user is photographed to be small, or if the face is located in a part where distortion may occur in an image, the electronic device 101 may identify that feature points having scores less than or equal to the threshold value are distributed in the entire facial area. The electronic device 101 may replace the entirety of the avatar with an image showing a predetermined facial expression (e.g., a neutral facial expression, happiness, sadness, or the like), a predetermined avatar shape image, or a previously displayed avatar shape image. The electronic device 101 may perform control not to display an avatar on the display device (e.g., the display device 160). According to another embodiment, even when a part of the facial area is beyond the field of vision of the camera module 180, if the facial area is detected and some feature points are not detected, the electronic device 101 may replace the entirety of the avatar with an image showing a predetermined facial expression (e.g., neutral facial expression, happiness, sadness, or the like), a predetermined avatar shape image, or a previously displayed avatar shape image.

Furthermore, if it is determined that the detection of a user facial area fails entirely (e.g., not face is detected), the electronic device 101 may display the avatar using the alternative image in operation 609. While an avatar is generated and is being displayed, if the electronic device 101 fails to detect the facial area of the user (e.g., the state of being partially photographed), feature points may not be generated and thus the facial expression of the user may not be applied to the facial expression of the avatar. The electronic device 101 may replace the entirety of the avatar with an image showing a predetermined facial expression (e.g., a neutral facial expression, happiness, sadness, or the like), a predetermined avatar shape image, or a previously displayed avatar shape image.

Figure 7:
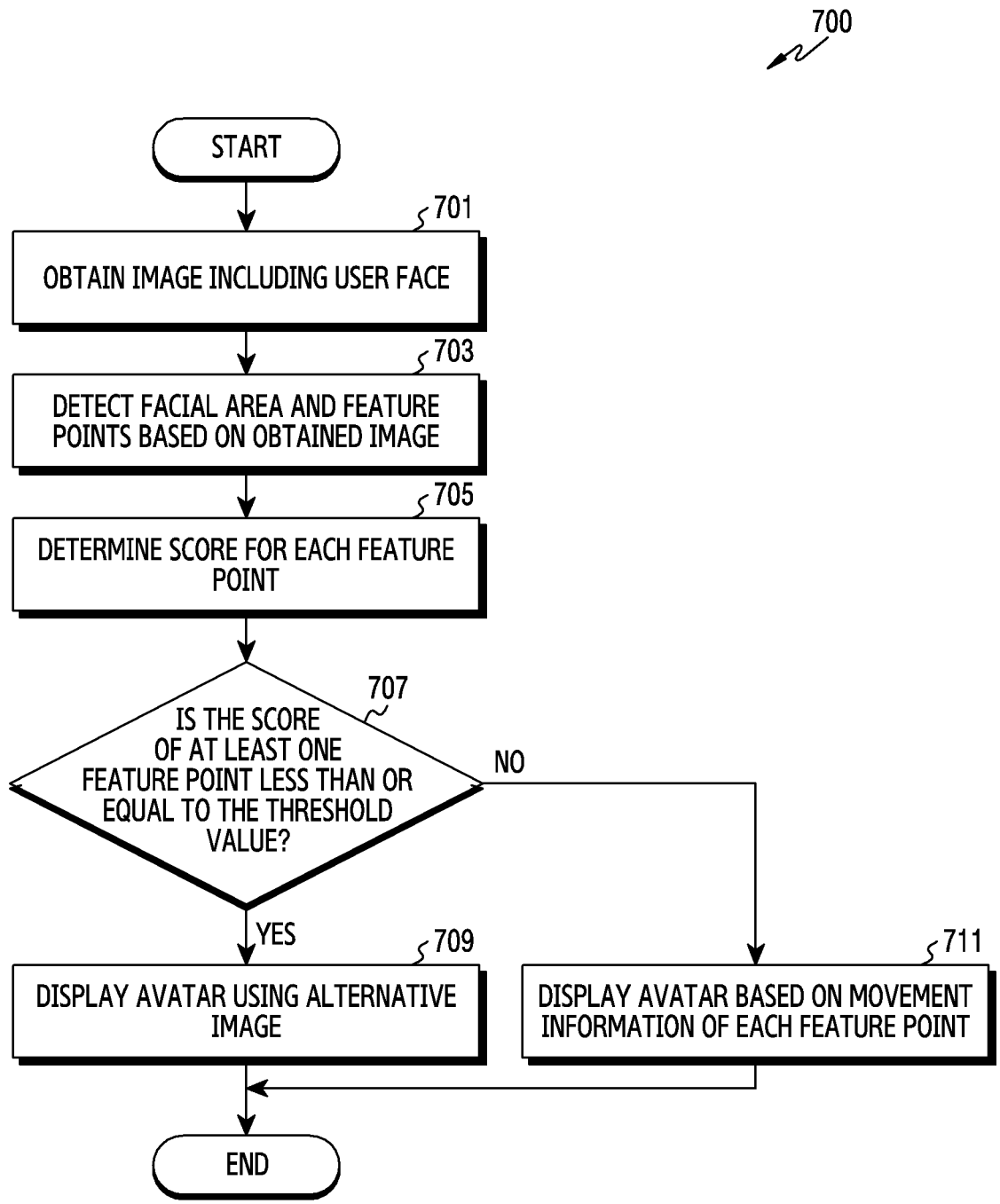
FIG. 7 is a flowchart illustrating a process of controlling the display of an avatar based on whether the face of a user is covered with an obstacle by an electronic device according to certain embodiments.

FIG. 7 is a flowchart 700 illustrating a process of controlling the display of an avatar based on whether the face of a user is covered with an obstacle by an electronic device according to certain embodiments. The entity that operates according to the flowchart 700 of FIG. 7 may be understood as the electronic device 101 or a component (e.g., the processor 120 or the camera module 180) of the electronic device 101.

Referring to FIG. 7, in operation 701, the electronic device 101 (e.g., the processor 120 or the camera module 180) may obtain an image including the face of a user. The electronic device 101 may obtain an image of a user for initial generation of an avatar, or may obtain an image by performing successive photographing after an avatar is generated. According to certain embodiments, a part of the face of the user may be covered with an obstacle and may not be displayed on the obtained image.

In operation 703, the electronic device 101 may detect the facial area and feature points of the user's face, as identified from the obtained image. The electronic device 101 may detect the contour of the face of the user from the obtained image so as to detect a facial area. The electronic device 101 may determine whether the contour of the face of the user is detected from the image, based on the symmetry of the face, face color information, or face brightness information. If a facial area is detected, the electronic device 101 may detect the feature points of the facial area. If a part of the face of the user is covered with an obstacle, location information of the feature points related to the face, which is detected by the electronic device 101, may be affected by the obstacle.

In operation 705, the electronic device 101 may determine a score for each feature point. The electronic device 101 may detect feature points from the facial area and may determine a score for each feature point. The electronic device 101 may generate movement information of each feature point in order to determine the facial expression of an avatar based on the determined score. In some embodiments, a weight may be assigned to the score.

In operation 707, the electronic device 101 may determine whether at least one feature point includes a score less than or equal to a threshold value. The electronic device 101 identifies at least one feature point having a score less than or equal to the threshold value among the feature points, and may determine at least one feature point indicating uncertain location information. The electronic device 101 may determine whether an obstacle is located in at least a part of the facial area using the score of each feature point.

If it is determined that at least one feature point having a score less than or equal to the threshold value exists, the electronic device 101 may display an avatar using an alternative image in operation 709. The electronic device 101 may determine that an obstacle exists in a part of the avatar which corresponds to at least one feature point having a score less than or equal to the threshold value, and may display the avatar using an alternative image. According to an embodiment, the electronic device 101 may replace the entirety of the avatar with an image showing a predetermined facial expression (e.g., a neutral facial expression, happiness, sadness, or the like), a predetermined avatar shape image, or a previously displayed avatar shape image. According to another embodiment, the electronic device 101 identifies a facial expression associated with another part so as to correct or replace feature points having scores less than or equal to the threshold value. For example, the electronic device 101 may correct or replace at least feature point having a score less than or equal to the threshold value using location information of feature points located in symmetric parts according to the symmetry of a face. According to another embodiment, the electronic device 101 may determine a facial expression based on the location information of feature points in another part, and may correct or replace feature points having scores less than or equal to the threshold value so as to correspond to the determined facial expression.

If it is determined that at least one feature point having a score less than or equal to the threshold value does not exist, the electronic device 101 may display an avatar based on movement information of each feature point in operation 711. If the score of each feature point is greater than the threshold value, information associated with the feature points may be reliably provided. The electronic device 101 may determine the facial expression of the avatar based on the movement information of each feature point, and may display the same on the display device (e.g., the display device 160) in operation 705.

Figure 8:
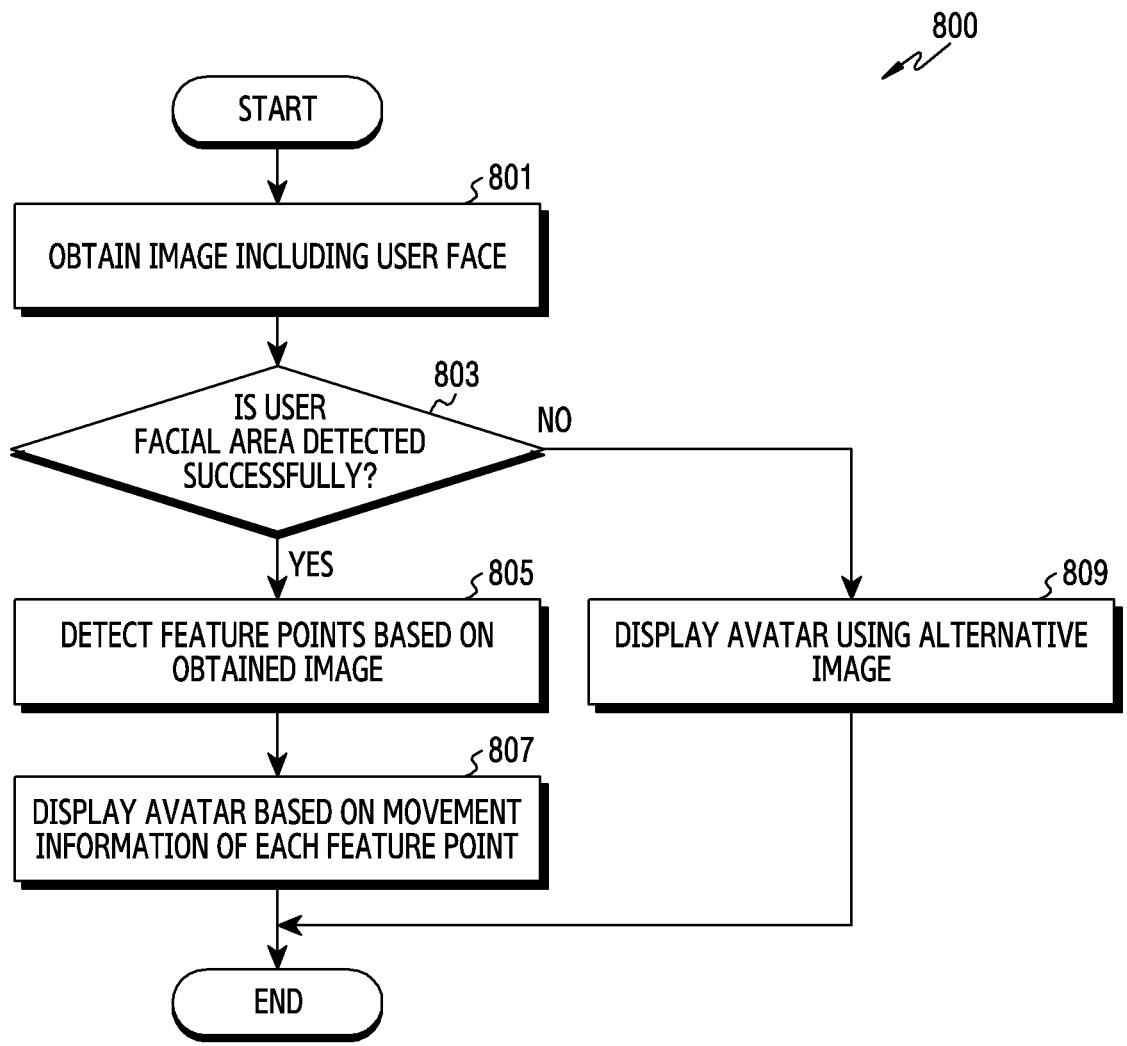
FIG. 8 is a flowchart illustrating a process of controlling the display of an avatar based on whether the facial area of a user is detected by an electronic device according to certain embodiments.

FIG. 8 is a flowchart 800 illustrating a process of controlling the display of an avatar based on whether the facial area of a user is detected by an electronic device according to certain embodiments. The entity that operates according to the flowchart 800 of FIG. 8 may be understood to be the electronic device 101 or a component (e.g., the processor 120 or the camera module 180) of the electronic device 101.

Referring to FIG. 8, in operation 801, the electronic device 101 (e.g., the processor 120 or the camera module 180) may obtain an image including the face of a user. According to certain embodiments, the electronic device 101 may obtain an image in which a part of the face of the user is not included while an avatar is generated and is being displayed. For example, the face of the user may be located at an edge as opposed to the center of a frame, so that a part of the face may not be photographed by a camera module (e.g., the camera module 180).

In operation 803, the electronic device 101 may determine whether the facial area of the user is successfully detected. The electronic device 101 may attempt to detect the facial area of the user from the obtained image. The electronic device 101 may determine whether the contour of the face of the user is detected from the image based on the symmetry of the face, face color information, or face brightness information. For example, the electronic device 101 may determine whether the contour of the face of the user, from which the shape of a face may be identified, is detected from the obtained image. When the image does not include a part of the face (e.g., if the face of the user is beyond the field of vision of the camera at the time of capture), the electronic device 101 may determine that the attempted detection of the face of the user had failed.

If it is determined that the facial area of the user is successfully detected, the electronic device 101 may detect feature points based on the obtained image in operation 805. If the facial area is recognized, the electronic device 101 may detect the feature points of the facial area.

In operation 807, the electronic device 101 may display an avatar based on movement information of each feature point. The electronic device 101 may determine the facial expression of the avatar using movement information indicating variation in the locations of feature points, and may display the same on the display device (e.g., the display device 160). Operation 807 is based on an image, which is photographed at a short distance to include the entire face, and may be assumed to be an operation performed by the electronic device 101 when feature points having scores less than or equal to a threshold value do not exist.

If it is determined that the detection of the facial area of the user fails, the electronic device 101 may display an avatar using an alternative image in operation 809. If the electronic device 101 fails to detect the facial area of the user while the avatar is generated and is being displayed, the electronic device 101 may determine not to generate any feature points, and may omit the operation of generating the avatar from an obtained image. According to an embodiment, the electronic device 101 may replace the entirety of the avatar with an image showing a predetermined facial expression (e.g., a neutral facial expression, happiness, sadness, or the like), a predetermined avatar shape image, or a previously displayed avatar shape image.

Figure 9:
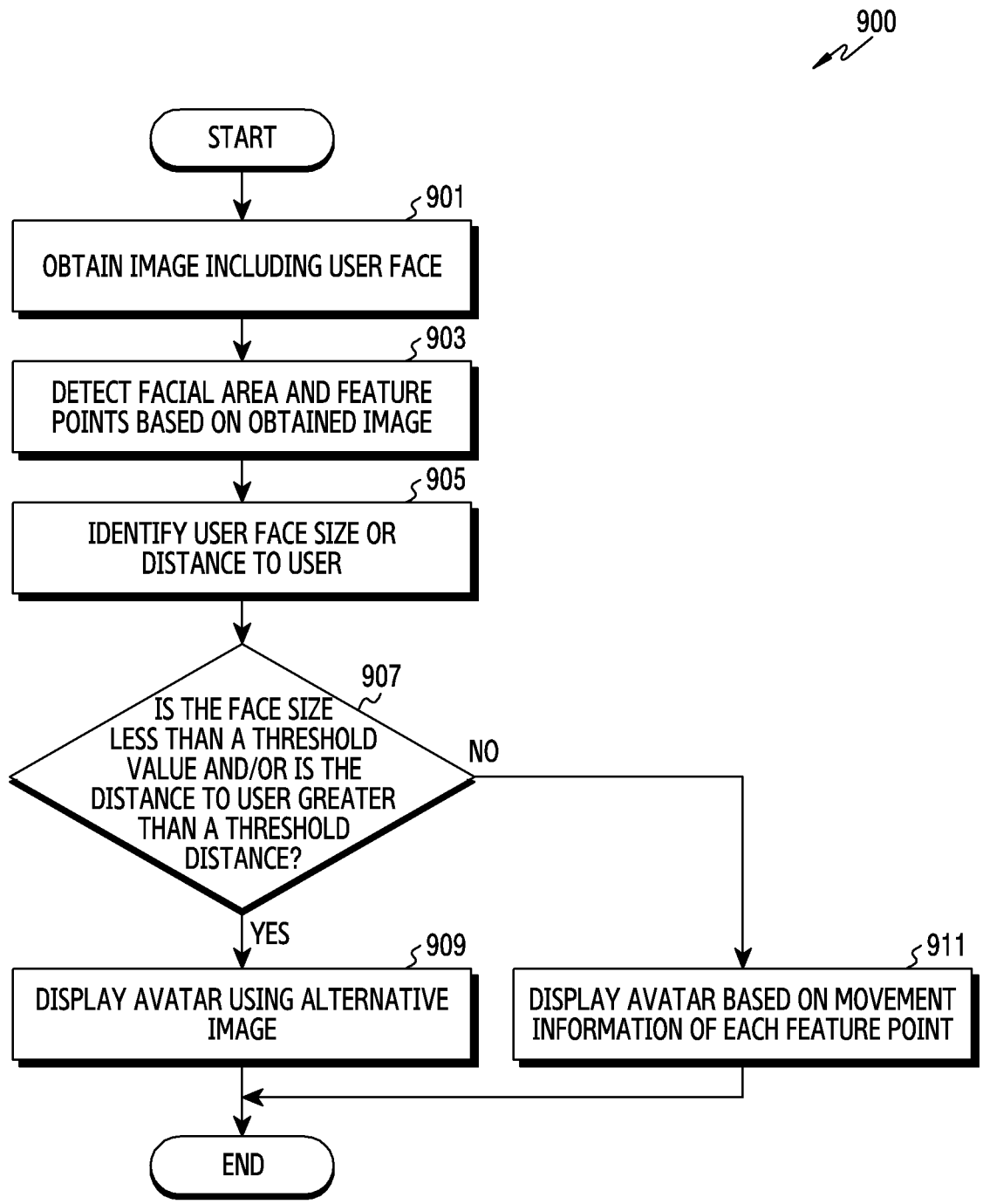
FIG. 9 is a flowchart illustrating a process of controlling the display of an avatar based on the distance of a user by an electronic device according to certain embodiments.

FIG. 9 is a flowchart 900 illustrating a process of controlling the display of an avatar based on the distance to a user by an electronic device according to certain embodiments. The entity that operates according to the flowchart 900 of FIG. 9 may be understood as the electronic device 101 or a component (e.g., the processor 120 or the camera module 180) of the electronic device 101.

Referring to FIG. 9, in operation 901, the electronic device 101 (e.g., the processor 120 or the camera module 180) may obtain an image including the face of a user. The electronic device 101 may obtain an image of a user for initial generation of an avatar, or may obtain an image by performing successive photographing after an avatar is generated. According to certain embodiments, the electronic device 101 may obtain an image in which the entire face of the user is included but the face is photographed to be small, compared to the size of the entire image, since the distance between the user and the electronic device 101 is long.

In operation 903, the electronic device 101 may detect the facial area of the user and feature points based on the obtained image. The electronic device 101 may detect the contour of the face of the user from the obtained image so as to detect a facial area. The electronic device 101 may determine whether the contour of the face of the user is detected from the image based on the symmetry of the face, face color information, or face brightness information. If the facial area is recognized, the electronic device 101 may detect the feature points of the facial area. Although the size of the face of the user is small compared to the total image size, the facial area may be recognized by detecting the contour of the entire face from the image, and thus the electronic device 101 may attempt to detect feature points of the face part.

In operation 905, the electronic device 101 may identify the size of the face of the user or the distance to the user. According to an embodiment, the electronic device 101 may measure the size of a facial area in an image and/or the ratio of a facial area size to the total image size so as to indirectly obtain the distance between the user and the electronic device 101. According to another embodiment, the electronic device 101 may identify the distance between the user and the electronic device 101 based on an auto focusing (AF) result obtained by the camera module 180 or a distance measurement sensor.

In operation 907, the electronic device 101 may determine whether the user face size is less than a threshold size (e.g., value), and/or may determine whether the distance to the user is greater than a threshold distance. According to an embodiment, the electronic device 101 may identify whether a facial area size and/or the ratio of a facial area size is less than a threshold size value, so as to determine whether at least one feature point indicating uncertain location information due to an excessive distance exists. That is, in some embodiments, a relative size of the user's features in the image may be used to estimate a distance between the camera and the user. The electronic device 101 may determine whether the distance between the user and the electronic device 101, which is identified in operation 905, is greater than a predetermined distance value. By comparing the distance between the user and the electronic device 101 with the set distance, the electronic device 101 may identify whether at least one feature point has uncertain location exists, before determining to utilize facial features to generate movement information. For example, if the distance to the user is greater than the set distance, it can be determined that at least one feature point includes a score less than or equal to a threshold score value in the image. Accordingly, the electronic device 101 may identify such a case in advance based on the distance to the user.

If it is determined that the user face size is less than the threshold value or that the distance to the user is greater than the set distance, the electronic device 101 may display an avatar using an alternative image in operation 909. The electronic device 101 may identify, in advance, at least one feature point that includes a score sufficient low as to impair normal generation and/or animation of an avatar, by direct or indirect detection of the distance to the user, and may display an avatar using an alternative image. According to an embodiment, the electronic device 101 may replace some or an entirety of the avatar with an alternative image, such as a previously displayed avatar shape image, a predetermined avatar shape image, an image showing a predetermined facial expression (e.g., a neutral facial expression, happiness, sadness, or the like), or the like. According to another embodiment, the electronic device 101 may perform control so as not to display an avatar on the display device (e.g., the display device 160).

If it is determined that the user face size is greater than or equal to the threshold value, or that the distance to the user is not greater than the set distance, the electronic device 101 may display an avatar generated and/or animated based on movement information derived from one or more feature points in operation 911. The electronic device 101 may determine the facial expression of the avatar using movement information, and may display the same on the display device 160. Operation 911 is based on an image which is photographed within the set distance so as to include the entire face, and may be assumed to be an operation performed by the electronic device 101 when at least one feature point having a score less than or equal to the threshold value does not exist.

Figure 10:
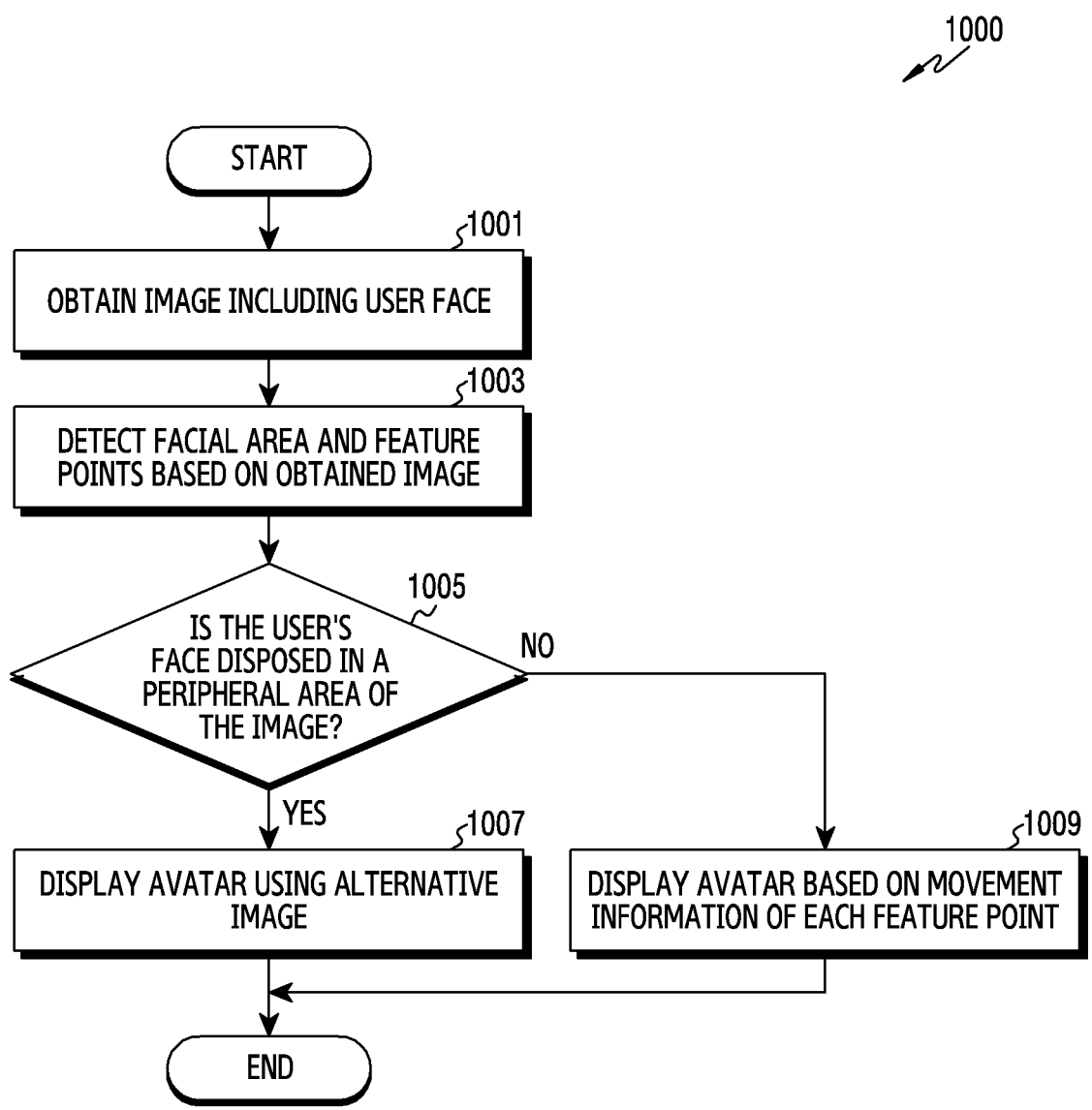
FIG. 10 is a flowchart illustrating a process of controlling the display of an avatar based on whether the face of a user is located in a peripheral area of an image, by an electronic device according to certain embodiments.

FIG. 10 is a flowchart 1000 illustrating a process of controlling the display of an avatar based on whether the face of a user is located in a peripheral area of an image by an electronic device according to certain embodiments. The entity that operates according to the flowchart 1000 of FIG. 10 may be understood as the electronic device 101 or a component (e.g., the processor 120 or the camera module 180) of the electronic device 101.

Referring to FIG. 10, in operation 1001, the electronic device 101 (e.g., the processor 120 or the camera module 180) may obtain an image including the face of a user. The electronic device 101 may obtain an image of a user for initial generation of an avatar, or may obtain an image by performing successive photographing after an avatar is generated. According to certain embodiments, the electronic device 101 may obtain an image in which the entire face of the user is included but the face is located in a peripheral area of the image where distortion may occur.

In operation 1003, the electronic device 101 may detect the facial area of the user and feature points of the face, based on the obtained image. As described above, the electronic device 101 may detect the contours of the face from the obtained image, so as to detect a facial area. The electronic device 101 may determine whether the contour of the face of the user is detected from the image based on the symmetry of the face, face color information, or face brightness information. If a facial area is recognized, the electronic device 101 may detect the feature points of the facial area. Even if the size of the face of the user is small compared to the total image size, the facial area may be recognized by detecting the contour of the entire face from the image, and thus, the electronic device 101 may attempt to detect feature points of the face part.

In operation 1005, the electronic device 101 may determine whether the facial area of the user is present in a peripheral area of the image. The peripheral area of the image may indicate an edge region of the image where distortion occurs due to the light-bending characteristics of a lens of the camera 180. Since an area where distortion may occur is determined based on the characteristics of a lens, the area may be defined in advance (i.e., and thus prestored in memory). The electronic device 101 may identify whether the location of a facial area detected from the image is included in the predetermined area, and may determine in advance whether at least one feature point that may indicate uncertain location information exists.

If it is determined that the facial area of the user exists in a peripheral are of the image, the electronic device 101 may display an avatar using an alternative image in operation 1007. The electronic device 101 may identify, in advance, that at least one feature point has a score sufficiently low, as to impair normal generation, animation and/or display of an avatar by identifying the location of the face of the user (i.e., in a peripheral region), and may thus display the avatar using an alternative image instead. According to an embodiment, the electronic device 101 may replace the entirety of the avatar with an alternative image, such as a previously displayed avatar shape image, a predetermined avatar shape image, an image showing a predetermined facial expression (e.g., a neutral facial expression, happiness, sadness, or the like), or the like. According to another embodiment, the electronic device 101 may perform control not to display an avatar on the display device (e.g., the display device 160).

If it is determined that the facial area of the user does not exist in a peripheral area of the image, the electronic device 101 may display an avatar based on movement information of each feature point in operation 1009. The electronic device 101 may determine the facial expression of the avatar using movement information, and may display the same on the display device 160.

According to certain embodiments, an operation method of an electronic device (e.g., the electronic device 101) may include: obtaining an image of a user of the electronic device for an avatar of the user using a camera of the electronic device; determining whether information associated with at least a part of a face of the user, which is detected from the obtained image, is obtained incompletely; and if the information associated with at least the part of the face of the user is determined to have been obtained incompletely, displaying the avatar on a display (e.g., the display device 160) of the electronic device using an alternative image.

According to certain embodiments, the operation of determining whether the information associated with at least the part of the face of the user, which is detected from the obtained image, is obtained incompletely may include determining whether at least a part of the face of the user detected from the obtained image is covered with an obstacle, and the operation of displaying the avatar on the display of the electronic device using the alternative image if the information associated with at least the part of the face of the user is determined to have been obtained incompletely may include displaying the avatar on the display of the electronic device using the alternative image if it is determined that at least a part of the face of the user is covered with the obstacle.

According to certain embodiments, the operation of determining whether at least the part of the face of the user detected from the obtained image is covered with the obstacle may include determining whether the obstacle exists based on whether the face of the user and another object corresponding to the obstacle overlap in the obtained image.

According to certain embodiments, whether the face of the user and the other object corresponding to the obstacle overlap is identified based on scores indicating reliability of feature points detected in association with the face of the user.

According to certain embodiments, the operation of displaying the avatar on the display (e.g., the display device 160) of the electronic device (e.g., the electronic device 101) using the alternative image may include displaying the avatar by replacing at least a part of the avatar using an image of the avatar having a predetermined shape.

According to certain embodiments, the operation of displaying the avatar on the display (e.g., the display device 160) of the electronic device (e.g., the electronic device 101) using the alternative image may include displaying the avatar by replacing at least a part of the avatar using an image of the avatar in a shape generated from an image obtained in a previous frame.

According to certain embodiments, the operation of displaying the avatar on the display (e.g., the display device 160) of the electronic device (e.g., the electronic device 101) using the alternative image may include substituting movement information of at least one other feature point for movement information of at least one feature point detected from the face of the user and controlling display of the avatar based on the substituted movement information.

According to certain embodiments, the operation of determining whether the information associated with at least the part of the face of the user detected from the obtained image is obtained incompletely may include: measuring a size of the face of the user in the obtained image; and identifying whether the size of the face of the user has a value smaller than a threshold value, and the operation of displaying the avatar on the display (e.g., the display device 160) of the electronic device (e.g., the electronic device 101) using the alternative image, if the information associated with at least the part of the face of the user is determined to have been obtained incompletely, may include displaying the avatar on the display of the electronic device using the alternative image, if the size of the face of the user is identified as having a value smaller than the threshold value.

According to certain embodiments, the operation of displaying the avatar on the display (e.g., the display device 160) of the electronic device (e.g., the electronic device 101) using the alternative image, if the information associated with at least the part of the face of the user is determined to have been obtained incompletely, may include displaying the avatar using the alternative image, if the face of the user is located in a peripheral area of the obtained image, and the peripheral area of the image may be an area in which the image is distorted due to a lens of the camera in the obtained image.

According to certain embodiments, the operation of displaying the avatar on the display (e.g., the display device 160) of the electronic device (e.g., the electronic device 101) using the alternative image, if the information associated with at least the part of the face of the user is determined to have been obtained incompletely, may include displaying the avatar on the display of the electronic device using the alternative image, if the face of the user is not detected from the obtained image.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of an electronic device, the method comprising:
    capturing an image using a camera of the electronic device for animation of an avatar, the image including at least a part of a face of a user;
    analyzing, by a processor, a portion of the image including the at least the part of the face to determine whether an entirety of the face is captured within the image; and
    selecting a primary image or an alternative image for display of the avatar based on the determination, including: displaying the avatar on a display of the electronic device using the alternative image when less than the entirety of the face is captured within the image,
    wherein analyzing the portion of the image further comprises detecting whether the face is partially obscured by an obstacle based on detecting an overlap between the face and an object within the captured image, and the avatar is displayed using the alternative image when the face is partially obscured by the obstacle.

2. The method of claim 1, further comprising:
    identifying, by a processor, a plurality of feature points in the captured image corresponding to major features of the face and calculating reliability scores for each of the plurality of feature points,
    wherein detecting the overlap between the face and the object is based partly on one or more of the reliability scores being less than or equal to a threshold score.

3. The method of claim 2, further comprising: identifying, by a processor, a plurality of feature points in the captured image corresponding to major features of the face,
    wherein the displaying the avatar using the alternative image comprises:
    substituting movement information of a first feature point with movement information of a second feature point, and animating the avatar using the substituted movement information.

4. The method of claim 1, wherein the alternative image is generated by replacing at least a part of the avatar using another at least a portion of another image of the avatar that includes a predetermined shape.

5. The method of claim 4, wherein the alternative image comprises an image of the avatar captured during a previous animation frame of the avatar.

6. The method of claim 1, wherein determining whether the entirety of the face is captured further includes:
    detecting a size of the face in the captured image; and
    determining whether the detected size of the face is smaller than a threshold size,
    wherein the captured image is determined to lack the entirety of the face when the detected size is smaller than the threshold size.

7. The method of claim 1, further comprising:
    storing in a memory an identification of a peripheral area of the captured image, indicating a region of the captured image distorted by a lens of the camera,
    wherein the avatar is displayed using the alternative image when the face of the user is located in the peripheral area.

8. The method of claim 1, further comprising:
    capturing a second image using the camera of the electronic device for the animation of the avatar; and
    in response to detecting that the second image lacks the face of the user entirely, displaying the avatar on the display using the alternative image.

9. An electronic device, comprising:
    a camera;
    a display;
    a memory storing instructions; and
    a processor, operatively coupled to the camera, the display and the memory,
    wherein the instructions are executable by the processor to cause the electronic device to:
    capture an image using a camera of the electronic device for animation of an avatar, the image including at least a part of a face of a user,
    analyze, by a processor, a portion of the image including the at least the part of the face to determine whether an entirety of the face is captured within the image, and
    select a primary image or an alternative image for display of the avatar based on the determination, including: displaying the avatar on a display of the electronic device using the alternative image when less than the entirety of the face is captured within the image,
    wherein analyzing the portion of the image further comprises detecting whether the face is partially obscured by an obstacle based on detecting an overlap between the face and an object within the captured image, and the avatar is displayed using the alternative image when the face is partially obscured by the obstacle.

10. The electronic device of claim 9, wherein the instructions are further executable by the processor to cause the electronic device to:

identify a plurality of feature points in the captured image corresponding to major features of the face and calculating reliability scores for each of the plurality of feature points, wherein detecting the overlap between the face and the object is based partly on one or more of the reliability scores being less than or equal to a threshold score.

11. The electronic device of claim 10, the instructions further executable by the processor to cause the electronic device to:

identify, by a processor, a plurality of feature points in the captured image corresponding to major features of the face, wherein displaying the avatar using the alternative image comprises:

substitute movement information of a first feature point with movement information of a second feature point, and animating the avatar using the substituted movement information.

12. The electronic device of claim 9, wherein the alternative image is generated by replacing at least a part of the avatar using another at least a portion of another image of the avatar that includes a predetermined shape.

13. The electronic device of claim 12, wherein the alternative image comprises an image of the avatar captured during a previous animation frame of the avatar.

14. The electronic device of claim 9, wherein determining whether the entirety of the face is captured further includes:

detecting a size of the face in the captured image; and determining whether the detected size of the face is smaller than a threshold size, wherein the captured image is determined to lack the entirety of the face when the detected size is smaller than the threshold size.

15. The electronic device of claim 9, further comprising:

storing in a memory an identification of a peripheral area of the captured image, indicating a region of the captured image distorted by a lens of the camera, wherein the avatar is displayed using the alternative image when the face of the user is located in the peripheral area.

16. The electronic device of claim 9, the instructions further executable by the processor to cause the electronic device to:

capture a second image using the camera of the electronic device for the animation of the avatar, and in response to detecting that the second image lacks the face of the user entirely, display the avatar on the display using the alternative image.

* * * * *